C. B. WITHINGTON.
Wire Band-Cutting Implement.
No. 198,442.  Patented Dec. 18, 1877.
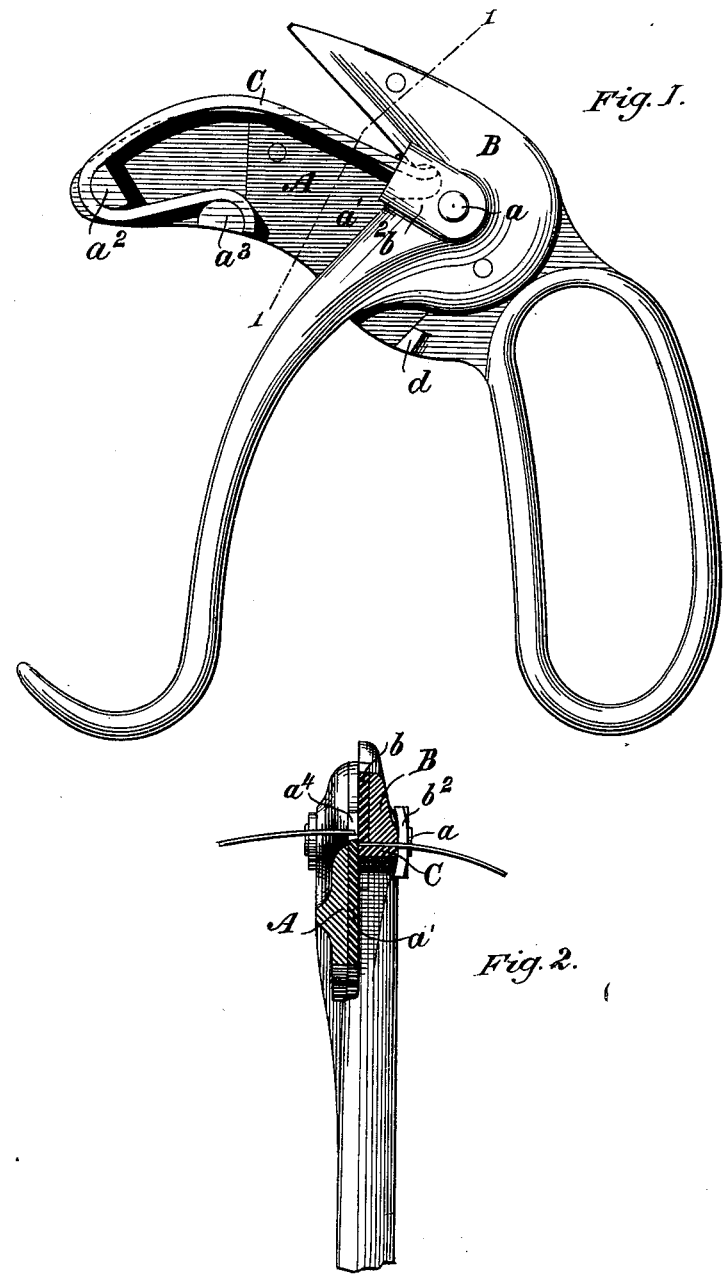

C. B. WITHINGTON.
Wire Band-Cutting Implement.
No. 198,442. Patented Dec. 18, 1877.
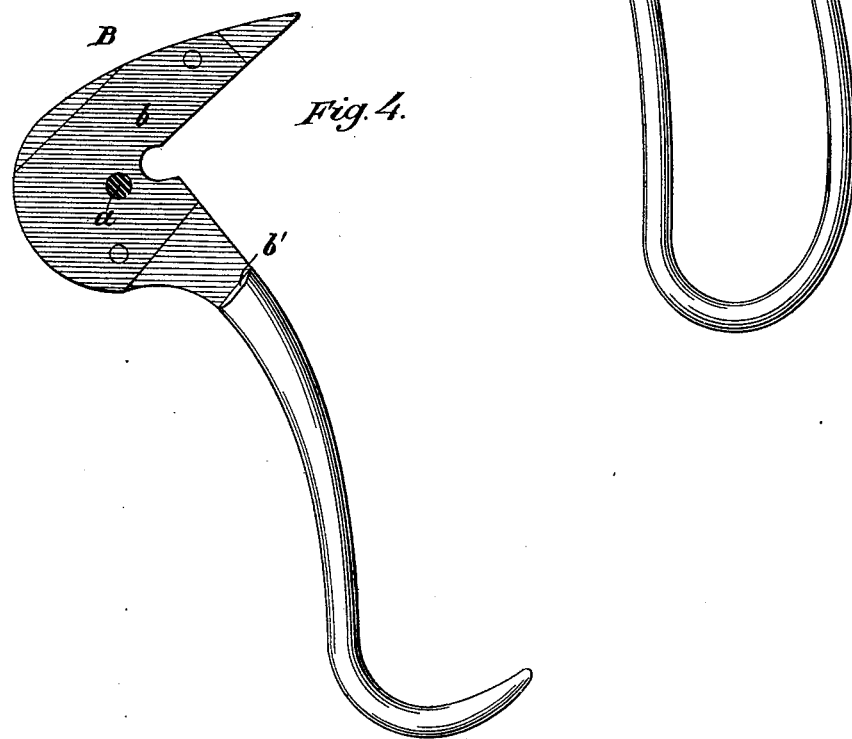
WITNESSES
C. Clarence Poole
G. W. Breck.
INVENTOR
Charles B. Withington
By his Attorneys
Baldwin, Hopkins & Peyton

UNITED STATES PATENT OFFICE.

CHARLES B. WITHINGTON, OF JANESVILLE, WISCONSIN, ASSIGNOR TO C. H. AND L. J. McCORMICK, OF CHICAGO, ILLINOIS.

IMPROVEMENT IN WIRE-BAND-CUTTING IMPLEMENTS.

Specification forming part of Letters Patent No. 198,442, dated December 18, 1877; application filed October 29, 1877.

*To all whom it may concern:*

Be it known that I, CHARLES B. WITHINGTON, of Janesville, in the county of Rock and State of Wisconsin, have invented certain new and useful Improvements in Wire Retaining and Cutting Implements, of which the following is a specification:

My invention principally relates to a device for removing wire bands from around bundles of grain which have been automatically bound by a grain-binding harvester, but is also applicable to other purposes, and belongs to that class of cutters which, in severing the wire, retain one end thereof in order to remove it the more easily from around the bundle, and to obviate the necessity of cutting and removing the wire by separate operations.

The object of my invention is to furnish an easily-handled, cheap, and effective implement.

The first part of my invention consists in the peculiar construction of the cutting-jaws of the implement, which are pivoted together and provided with handles, the main jaw being curved, extended, and furnished with a spring secured at its forward end, the free end of which spring rests in a recess in, and exerts its tension against, the other jaw, holding the two normally open, in which position of the jaws the spring rises above the cutting-edge of the main one and directly under the other, so that when the two jaws are brought together the wire is clamped and severed, and one of the severed ends retained in the implement until released.

My invention further consists in an improved wire-cutting implement, consisting of a pair of jaws provided with steel cutting-blades, a spring to clamp the wire and separate the jaws, and a gage plate or shoulder to gage the entrance of the wire between the jaws, all as hereinafter more fully described and claimed.

In the accompanying drawings, Figure 1 represents a view, in elevation, of my improved implement with the jaws open; Fig. 2, a section therethrough on the line 1 1 of Fig. 1, the jaws being closed and a wire represented as being cut, and one end retained between the upper cutting-jaw and the clamping-spring. Fig. 3 represents a view of the main jaw detached, and Fig. 4 a similar view of the other jaw of the implement.

The implement is composed of a main jaw, A, provided with a looped handle, and a jaw, B, also provided with a suitable handle, the two jaws being pivoted together at the point $a$, and being, respectively, provided with steel cutting-blades $a^1$ $b$, dovetailed therein and secured by rivets, or in any other well-known way.

The main jaw of the implement is extended outward, and curved in the form shown, and is provided near its outer end with lugs or bearing-points $a^2$ $a^3$, which constitute the retaining-points and means of securing one end of a spring, C, which is similar in shape to the jaw, and has its free end inserted in a recess in the under surface of the jaw B. This spring serves to separate the jaws and hold them normally open for the entrance of the wire, in which position the spring is parallel with the cutter-blade of the main jaw, and extends a short distance above it and directly under the jaw B, as shown in Figs. 1 and 3.

When the implement is inserted over the wire, and pressure is applied upon the handles to force the jaws together, the wire is clamped between the jaw B and the spring, which spring moves down under the pressure of the jaw until the cutting-blades sever the wire, one end of which will be retained in the implement as long as the pressure is maintained upon the handles, whereby I am enabled to cut the wire band and remove it from the bundle at one and the same operation, and when so removed the wire may be released, the tension of the spring throwing the jaws apart as soon as the pressure is removed.

The jaw B is brought to a point, as shown in Figs. 1 and 4, for convenience of insertion under the wire, and its movement upon the jaw A is limited in one direction by the stud $d$, and in the other by the shoulder $b^1$.

To gage the inward movement of the wire between the jaws, I provide the cutter-plate of the jaw A with a shoulder, $a^4$, and the jaw B with a plate, $b^2$; but any other gage may be employed if necessary.

What I claim as my invention is—

1. The jaws of the wire-cutting implement, constructed as described, one of which is curved, extended, and provided with a spreading and clamping spring, of similar shape, and the other jaw, which is acted upon by the spring, terminating in a pointed end for the better insertion beneath the wire, substantially as set forth.

2. The improved wire-cutting implement, constructed substantially as hereinbefore set forth, consisting of the jaws, their handles, the steel cutting-blades, the clamping and spreading spring, and a gage for the wire.

In testimony whereof I have hereunto subscribed my name.

CHAS. B. WITHINGTON.

Witnesses:
JOHN V. A. HASBROOK,
F. H. MATTHEW.